(12) United States Patent
Dropps et al.

(10) Patent No.: US 8,761,020 B1
(45) Date of Patent: *Jun. 24, 2014

(54) METHOD AND SYSTEM FOR LOAD BALANCING IN INFINIBAND SWITCHES AND NETWORKS

(75) Inventors: Frank R. Dropps, Maple Grove, MN (US); Ian G. Colloff, Los Gatos, CA (US); James A. Kunz, Plymouth, MN (US); Ernest G. Kohlwey, Eagan, MN (US)

(73) Assignee: Intel Corporation, Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/236,458

(22) Filed: Sep. 19, 2011

Related U.S. Application Data

(63) Continuation of application No. 11/668,935, filed on Jan. 30, 2007, now Pat. No. 8,050,260.

(51) Int. Cl.
*H04L 12/28* (2006.01)
*G06F 13/00* (2006.01)
*G06F 15/173* (2006.01)

(52) U.S. Cl.
USPC ............ 370/237; 370/389; 709/239; 710/316

(58) Field of Classification Search
USPC ................. 370/221, 539, 541, 216–218, 225, 370/227–228, 237, 388–389, 392, 395.31, 370/400, 401; 709/238–244, 228–229; 710/38, 60–61, 316
See application file for complete search history.

(56) References Cited

U.S. PATENT DOCUMENTS

| | | | | |
|---|---|---|---|---|
| 6,658,521 | B1* | 12/2003 | Biran et al. | 710/315 |
| 6,788,682 | B1* | 9/2004 | Kimmitt | 370/389 |
| 6,888,792 | B2* | 5/2005 | Gronke | 370/227 |
| 7,133,929 | B1* | 11/2006 | Shah | 709/241 |
| 2003/0021223 | A1* | 1/2003 | Kashyap | 370/217 |
| 2003/0195983 | A1* | 10/2003 | Krause | 709/238 |
| 2006/0107323 | A1* | 5/2006 | McLean | 726/23 |

OTHER PUBLICATIONS

Performance Enhancements Techniques for Infiniband Architecture, Kim et al, IEEE 2002.*

\* cited by examiner

*Primary Examiner* — Habte Mered
(74) *Attorney, Agent, or Firm* — Blakely, Sokoloff, Taylor & Zafman LLP

(57) ABSTRACT

A switch element and a method for routing packets in an IB Multi Level switch and network is provided. The method includes determining if alternate routing is enabled for a packet; determining an alternate route address for the packet, if alternate routing is enabled; and routing the packet using the alternate route address, if the alternate route address is valid. The switch element includes a routing table in a port that determines a base route address; and if alternate routing is enabled for a packet, the port determines an alternate route address for a packet; and routes the packet using the alternate route address.

20 Claims, 7 Drawing Sheets

METHOD AND SYSTEM FOR LOAD BALANCING IN INFINIBAND SWITCHES AND NETWORKS

The present application is a continuation of U.S. patent application Ser. No. 11/668,935, filed on Jan. 30, 2007, now U.S. Pat. No. 8,050,260.

BACKGROUND

1. Field of the Invention

This invention relates in general to networks, and more particularly to load balancing in InfiniBand switches and networks.

2. Background of the Invention

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets.

InfiniBand ("IB") is a switched fabric interconnect standard for servers, incorporated herein by reference in its entirety. IB technology is deployed for server clusters/enterprise data centers ranging from two to thousands of nodes. The IB standard is published by the InfiniBand Trade Association, and is incorporated herein by reference in its entirety.

An IB switch is typically a multi-port device. Physical links (optical or copper) connect each port in a switch to another IB switch or an end device (for example, Target Channel Adapter (TCA) or a Host Channel Adapter (HCA)).

In a multi-tier IB switch environment, plural IB switches are connected through inter-switch links (ISL). ISLs may be uplinks or downlinks. It is desirable to avoid over usage or under usage of IB network links for optimum network throughput.

SUMMARY

In one embodiment a method for routing packets in an IB network is provided. The method includes determining if alternate routing is enabled for a packet; determining an alternate route address for the packet, if alternate routing is enabled; and routing the packet using the alternate route address, if the alternate route address is valid.

In another embodiment, a switch element for routing packets in an IB network is provided. The switch element includes a routing table in a port that determines a base route address; and if alternate routing is enabled for a packet, the port determines an alternate route address for a packet; and routes the packet using the alternate route address.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of various embodiments. In the drawings, the same components have the same reference numerals. The illustrated embodiments are intended to illustrate, but not to limit the invention. The drawings include the following Figures.

DETAILED DESCRIPTION

Definitions

The following definitions are provided for convenience as they are typically (but not exclusively) used in IB and general networking environment, implementing the various adaptive aspects described herein.

"DLID": Destination local identifier is a field in an IB packet identifying a local subnet packet destination.

"Downlink": Portion of an ISL that routes packets from a Spine switch element to a switch element coupled to an end device.

"Inter switch link" or "ISL": A physical link that is used for connecting two or more IB switches.

"Load Balancing": A method for optimizing load on a network link or network links between switch elements in a Multi Level switch.

"Multi Level Switch": A switch that includes a plurality of switch elements operationally coupled together "Opcode": Opcode is a field in an IB packet that indicates the IB packet type.

"Packet": A group of one or more network data word(s) used for network communication.

"QP": Destination queue pair is a field in an IB packet that indicates the work queue pair number at a destination.

"Routing Table": A table that stores information for routing a packet.

"SLID": Source local identifier is a field in an IB packet identifying local subnet packet source.

"Spine": A switch element within a Multi Level switch and is primarily used for switching data packets between other switch elements. It may also be referred to as a cross connect switch element.

"Switch": A device that facilities network communication conforming to IB and other switch standards/protocols.

"Uplink": Portion of an ISL that routes packets from a switch element coupled to an end device and to a Spine switch element.

To facilitate an understanding of the various aspects, the general system/process for transmitting data in IB switches is described. The specific architecture and operation is then described with reference to the general description.

Figure 1A:
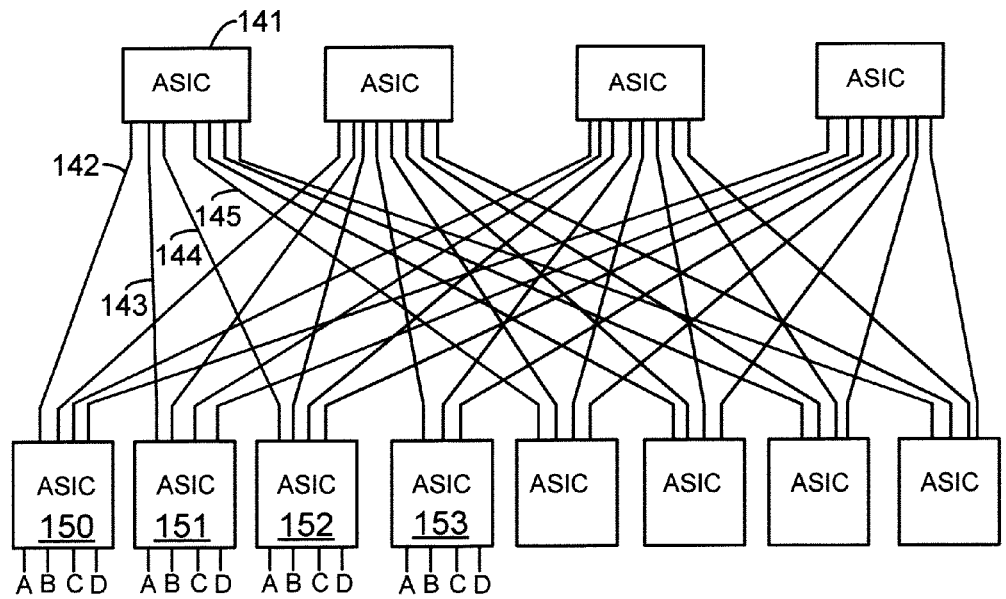
FIG. 1A shows a multi-tier IB network illustrating over-subscription.

FIG. 1A shows a Multi Level IB switch system with a plurality of Application Specific Integrated Circuits ("ASIC") (switch elements) 141, 150, 151, 152, 153 inter-connected via plural ISLs (for example, 141, 143, 144 and 145). Switch elements 150, 151, 152 and 153 are shown having four ports A, B, C and D and the ports are referred to as 150A, 150B, 150C, 150D (for ASIC 150) and so forth. However, each switch element may have any number of ports and the number of ports may not be equal.

The Uplink of ISL 142 routes packets from ASIC 150 to ASIC 141, while uplinks of ISL 144 and ISL 145 route packets from ASIC 152 and ASIC 153 to ASIC 141. The Downlink of ISL 143 routes packets from ASIC 141 to ASIC 151.

Typically, when a packet arrives at a port (150A) of an IB switch element (for example, ASIC 150), the port performs a look-up using a static routing table to determine packet destination (for example, PORT 150A to PORT 151A). In some instances, a packet is routed to one switch element via an uplink and then routed back to another switch element via another downlink. For example, a packet may be routed via the uplink of ISL 142 to IB switch element 141 and then routed back via the downlink of ISL 143 to IB switch element 151.

Static routing table based routing has disadvantages because a particular downlink may be over used ("over subscribed") by attempting to transmit multiple packets at the same time; or may be under utilized ("or under subscribed"). For example in FIG. 1A, ASIC 141 receives packets from ASICs 150, 152 and 153 and then routes them to ASIC 151 using the downlink of ISL 143. Since the downlink of ISL 143 is used for routing packets from the foregoing ASICs, it may result in over subscription, reducing Multi Level switch and overall network throughput.

Also, depending on a routing path, uplink 142 may be over subscribed. For example, uplink 142 may be over subscribed when port 150A sends packets to port 151A; port 150B sends packets to port 152A; port 150C sends packets to port 153A and port 150D sends packets to 154A. The static routing path selection and data packet flow distribution may determine which link may be over subscribed or under subscribed, at any given time.

The various adaptive aspects described herein provide a load balancing system and method to optimize link usage (for both Uplinks and Downlinks) and avoid over subscription and under subscription conditions, improving overall Multi Level switch and network throughput.

Figure 1F:
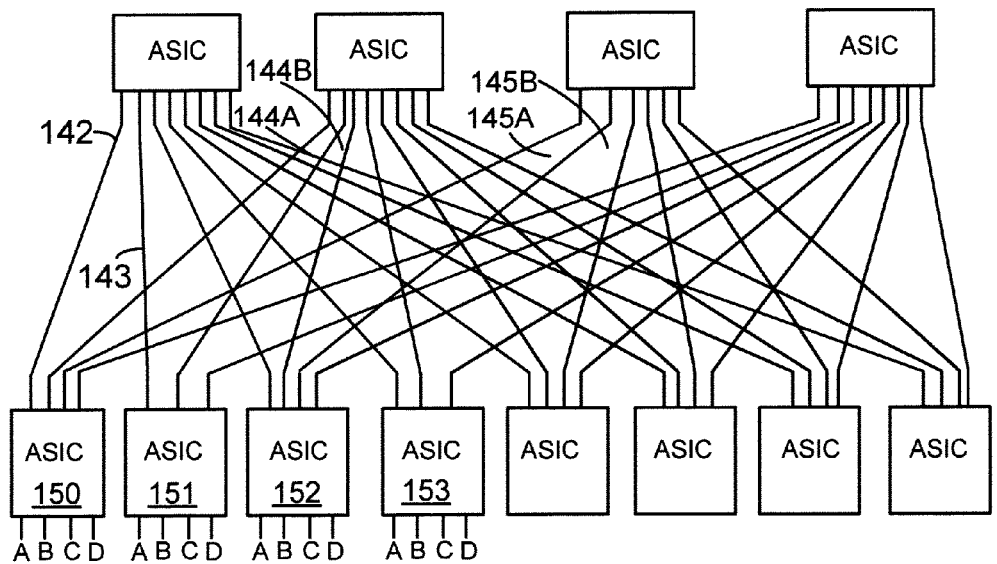
FIG. 1F shows an example of load-balancing in a multi-tier IB network, according to one embodiment.
Figure 1B:
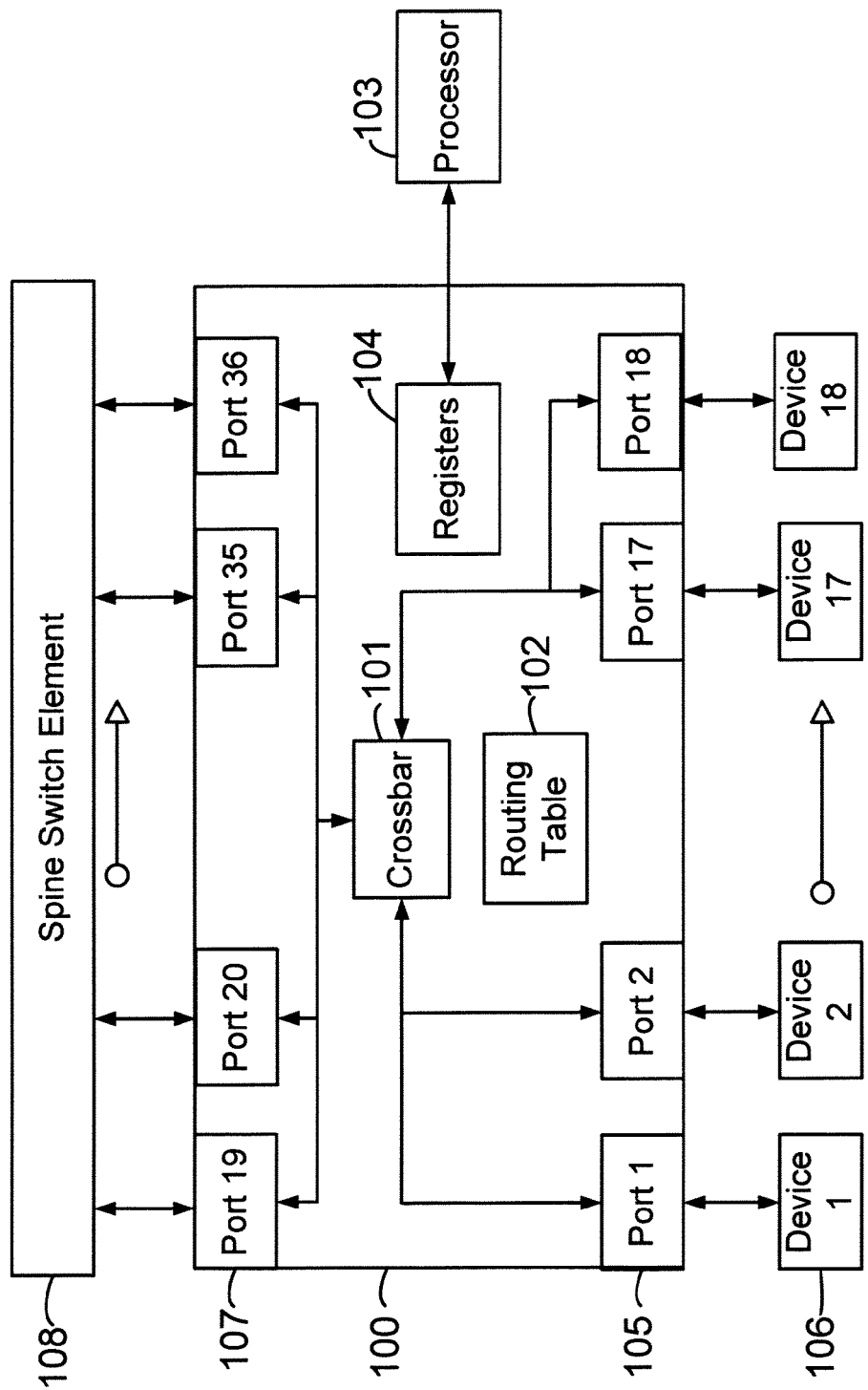
FIG. 1B shows an IB switch, according to one embodiment.

FIG. 1B shows an IB switch element 100, according to one aspect. The switch element may be implemented as a single CMOS ASIC, and for this reason the term "switch", "switch element" and ASIC are used interchangeably to refer to the various embodiments in this specification.

ASIC 100 may include plural ports, for example, 36 ports, shown as Port1 through Port36. Each port includes a receive port (or segment) for receiving packets and a transmit port (or segment) for transmitting packets. Port (Port1-Port36) functions depend on the type of device it is attached to. For example, Port1 105 may be coupled to Device1 106 and may be used primarily to route packets to and from Device1 106. Similarly, Port 19 (107) is coupled to Spine 108 and is used to route packets to and from Spine 108. Although FIG. 1B shows 36 ports, the adaptive aspects disclosed herein are not limited to any particular number of ports.

For illustration purposes only, in FIG. 1B, all ports coupled to end devices are on one side of ASIC 100 and ports connected to Spine 108 are on the opposite side. However, the ports may be located on any side of ASIC 100. This does not imply any difference in port or ASIC design. Actual physical layout of the ports depends on the physical layout of the ASIC.

Each port (for example, Port1-port3 includes transmit and receive connections to the switch crossbar 101. Crossbar 101 may use information from routing table 102 to route packets. Although only one routing table is depicted there may be multiple copies to provide increased bandwidth.

Register(s) 104 receive and hold control information accessible by a general-purpose processor 103. Processor 103 can change characteristics or operating configuration of ASIC 100 by placing certain control words in registers 104.

Figure 1C:
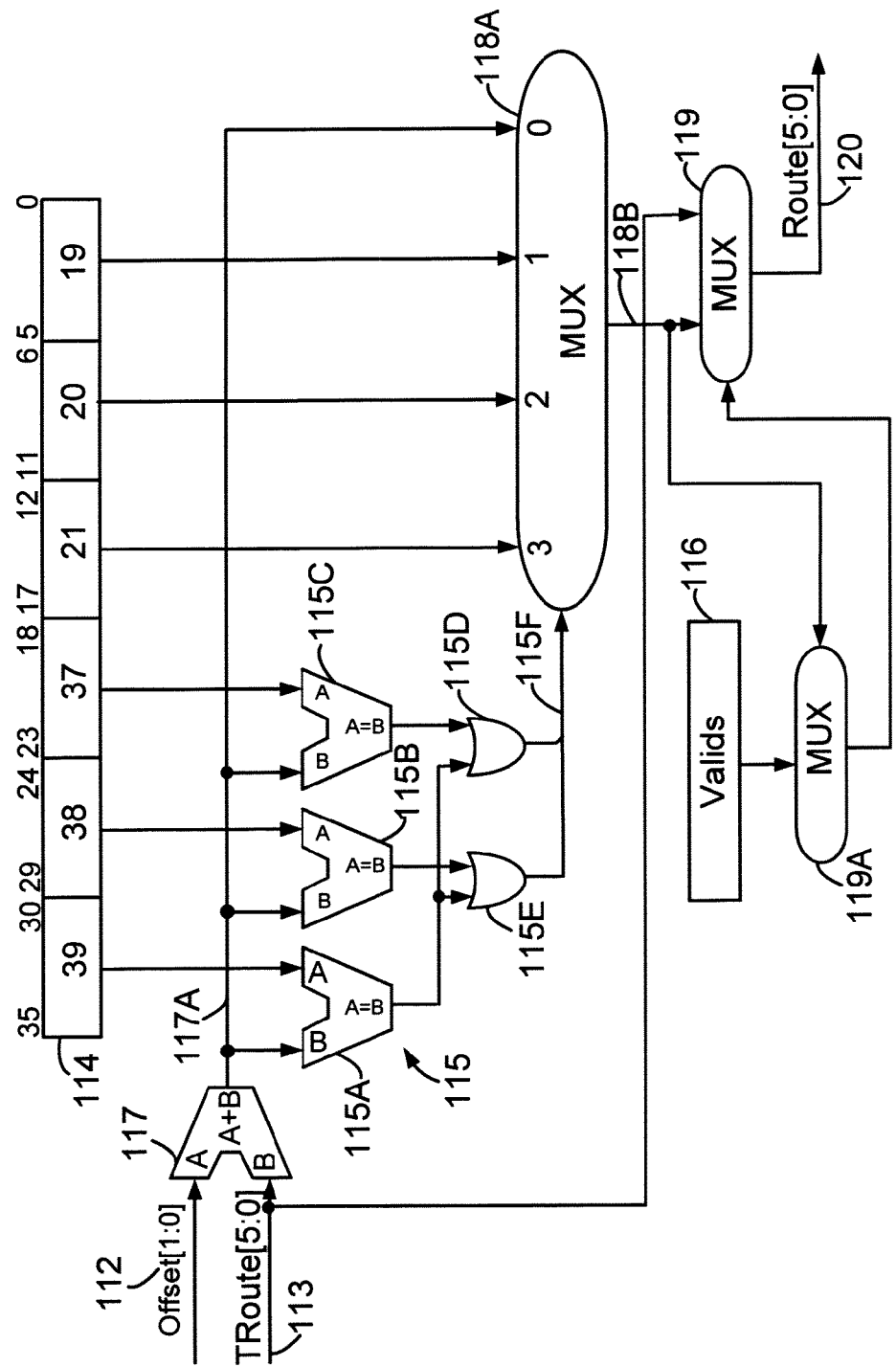
FIG. 1C shows an example for determining an alternate route for an IB packet, according to one embodiment.

FIG. 1C shows a circuit 115 for determining an alternate route for an IB packet, according to one aspect of this disclosure. The alternate route is intended to reduce over-subscription in Multi Level switch internal links as well as network links. Circuit 115 may be located in each switch element and switch port.

Figure 1D:
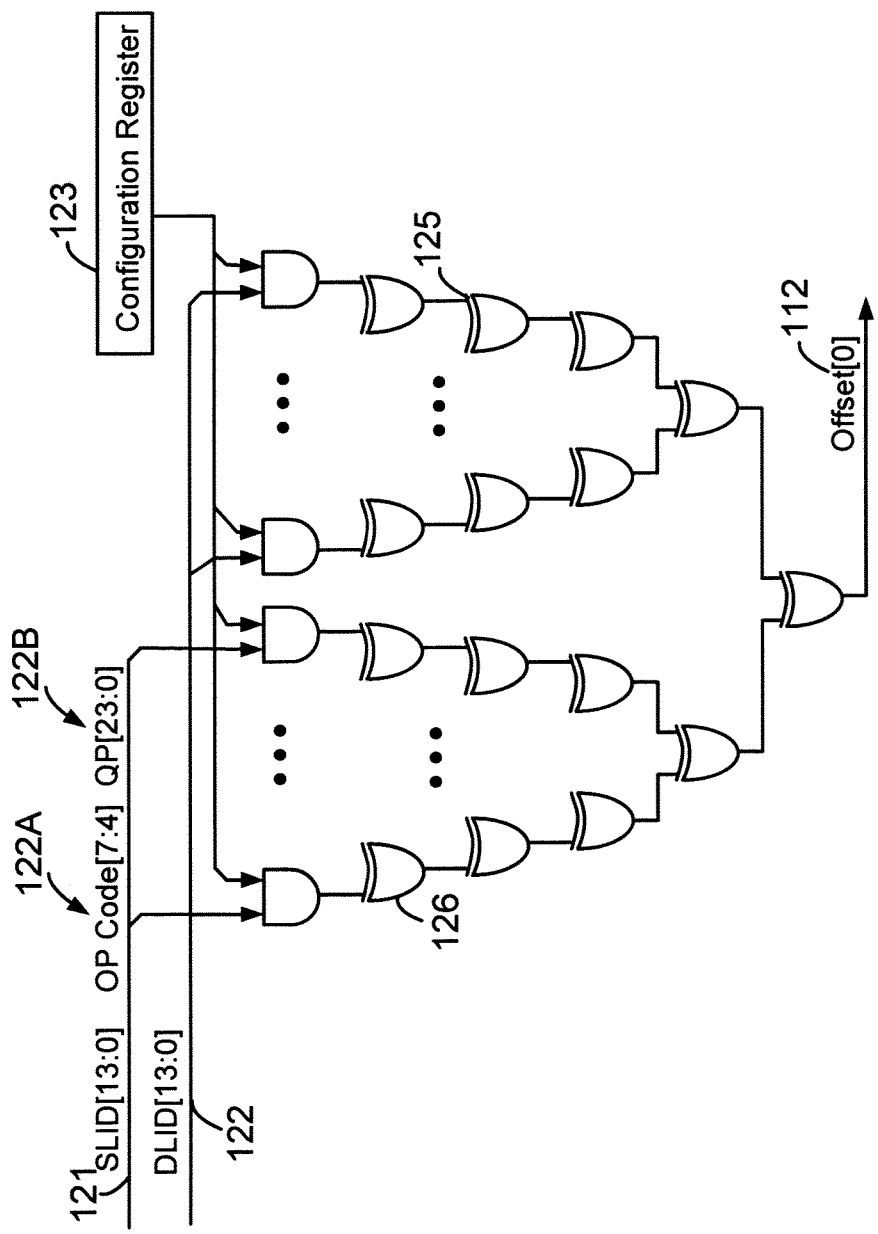
FIG. 1D shows an example for determining a route offset, according to one embodiment.

When a packet is received at a port (for example Port1 105), the port determines base route 113 based on a DLID. An offset 112, which is determined using a circuit described below with respect to FIG. 1D, is added to base route 113 via adder 117. Output 117A from adder 117 is sent to plural comparators 115A, 115B and 115C. Comparators 115A, 115B and 115C also receive inputs from configuration register 114. Configuration register 114 may be a part of registers 104 and is accessible to Processor 103. As an example, values 39, 38 and 37 are register 114 inputs to comparators 115A, 115B and 115C, respectively.

Comparators 115A-115C are used to detect a "wrap-around" condition. A wrap-around condition occurs when output 117A is greater than a maximum switch element port number. In the case of a 36-port ASIC 100, if the output of adder 117 is greater than 36, then a valid port number is selected as an alternate route. The wrap-around conditions are made programmable to allow for switch element connected in different topologies, the ability to skip inactive or failed links and to allow different port stride values.

The output from comparators 115A-115C pass through logic gates 115D and 115E to generate a select signal 115F. Select signal 115F selects data from one of the plural inputs (for example, 4) to multiplexer ("Mux") 118A. Three of these inputs (shown as values 21, 20 and 19) are from register 114 and the fourth input is 117A. Output 118B (from MUX 118A) and base route 113 are then input to another Mux 119.

Route 120 is generated via Mux 119 after a valid signal for the selected alternate port is obtained from register 116 (via Mux 119A). Route 120 is then used to route the packet. If the alternate port selected is not valid then Mux 119 selects a different route. When the route valid information is gathered automatically, then circuit 115 may be used to automatically heal a network or the Multi Level switch when links are bad or become inactive.

FIG. 1D shows an example of a circuit for calculating route offset 112, according to one aspect of this disclosure. Offset 112 is used to determine alternate route 120 (FIG. 10 or FIG. 1E) for a packet when load balancing is implemented, according to one embodiment. When a packet arrives at a port, DLID 122, SLID 121, Opcode 122A, QP 122B and other fields are extracted from the packet header. Bits 13 to 0 of DLID 122, bits 13 to 0 of SLID 121, bits 7 to 5 of Opcode 127 and bits 23 to 0 of QP packet fields are input to a series of logic gates 125 and 126 that calculate parity. It is noteworthy that other fields or bits of the packet may be input to logic gates 125 and 126 for calculating parity.

In one aspect, the Opcode field 122A may be used to identify unreliable datagram (UD) packets to allow for random route selection or selection of routes with the lightest traffic loads.

Configuration register 123 (may be a part of registers 104) is programmed with information for computing parity. For example, an algorithm like a "standard hamming code" may be used to determine input bits. For example if a bit in configuration register 123 has a value of "1" then the corresponding bit extracted from the packet is used in the parity calculation. If the value is "0" then the corresponding bit is not used in the parity calculation.

There may be different ways to implement the algorithms for determining parity. For example, if a scheme for calculating one bit and skipping one bit is used in the algorithm, then parity may be computed on bits 0,2,4,6,8 and so forth. Similarly, if calculating two bits and skipping two bits is used, then parity is computed on bits 0,1,4,5,8,9 and so forth. Different algorithms may be used to obtain uniform distribution for offset 112. Statistics may be collected to further improve distribution for offset 112.

FIG. 1D shows an example of a programmable circuit for calculating parity used for one bit of Offset 112. Additional bits of offset 112 may be calculated by the use of additional copies of the circuit in FIG. 1D. Each Offset 112 bit (calculated parity bit) may use different configuration register 123 values. The same values maybe used for adjusting the stride or to reduce the total number of alternate routes to be selected.

Figure 1E:
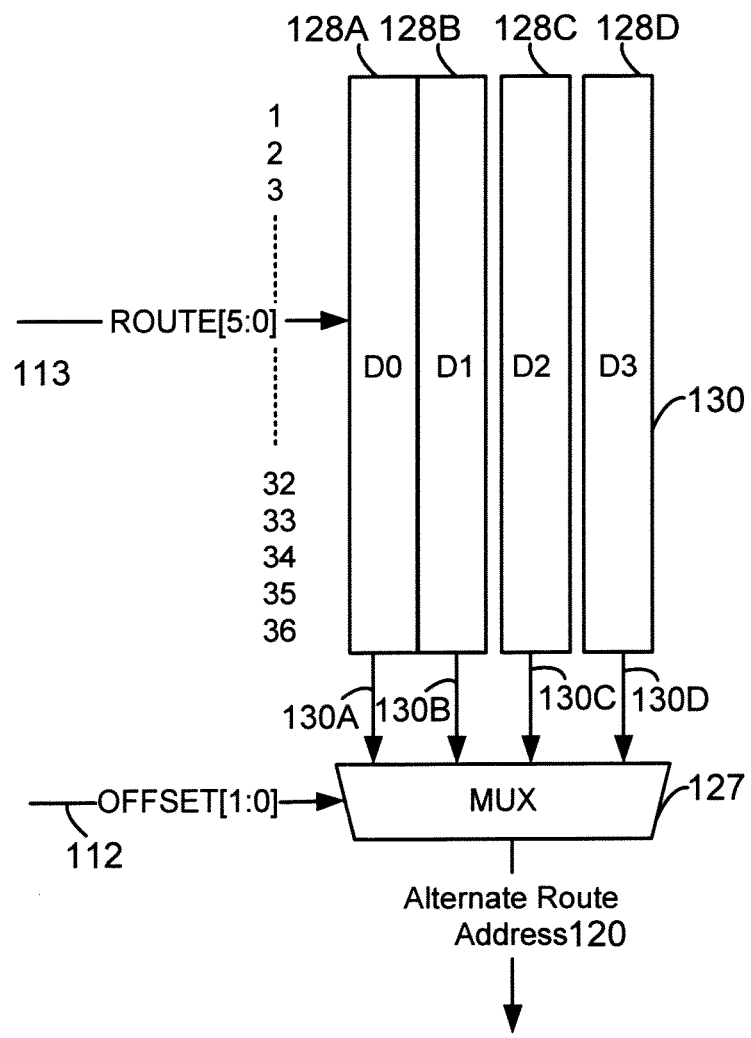
FIG. 1E shows another example for determining an alternate route for an IB packet, according to one embodiment.

FIG. 1E shows yet another example for determining an alternate route for an IB packet, according to one aspect of this disclosure. Look up table (LUT) 130 receives route 113 (which may also be referred to as a "base address") and is used to determine an alternate route address 120, according to one embodiment. LUT 130 may be implemented as a standard static random access memory ("SRAM") or using a set of registers. It is noteworthy that LUT 130 may be implemented by other storage elements and is not limited to an SRAM or register implementation.

LUT 130 includes plural columns (shown as D0, D1, D2 and D3), for example, columns 128A, 128B, 128C and 128D that store destination addresses for each base route. The number of rows in LUT 130 may be equal to the number of base addresses possible, i.e., number of ports in ASIC 100. It is noteworthy that 4 columns are shown as an example, and any number of columns may be used to build LUT 130.

LUT 130 output (shown as 130A, 130B, 130C and 130D) includes plural alternate destination addresses that are input to Mux 127. Offset 112 (FIG. 1D), is used to select one of the destinations. Mux 127 generates alternate route address 120 to route the packet.

It is noteworthy that Offset 112 may be used to form part of a memory address in a different LUT 130 configuration.

LUT 130 may also be used to remap actual physical port numbers to other port numbers (for example, virtual port numbers). Setting a control register bit in registers 104 may enable the remapping of physical port numbers. The remapping function may be used for various reasons, for example, if a link has been renamed; a switchboard design has been changed; link may be disabled and any other reason.

If remapping is enabled, then LUT 130 is loaded with remapped port numbers instead of actual physical port numbers derived directly from route 113. The remapped port numbers are then used to route the packet.

FIG. 1F shows an example of load-balancing in a multi-module IB network, according to one aspect. FIG. 1F uses alternate route addresses for packets. For example, a packet that is routed from Port 150B to Port 151B uses the uplink of ISL 144A and the downlink of ISL 144B instead of using the over-subscribed downlink of ISL 143. Similarly, a packet that is routed from Port 150C to Port 151C uses the uplink of ISL 145B and the downlink of ISL 145A instead of using the over-subscribed downlink of ISL 143.

According to one embodiment, using alternate routes reduces congestion on an over-subscribed link (for example downlink of ISL 143) and balances load over multiple links. This method of load balancing enables a Multi Level switch and the network to perform efficiently with minimal congestion.

Figure 2A:
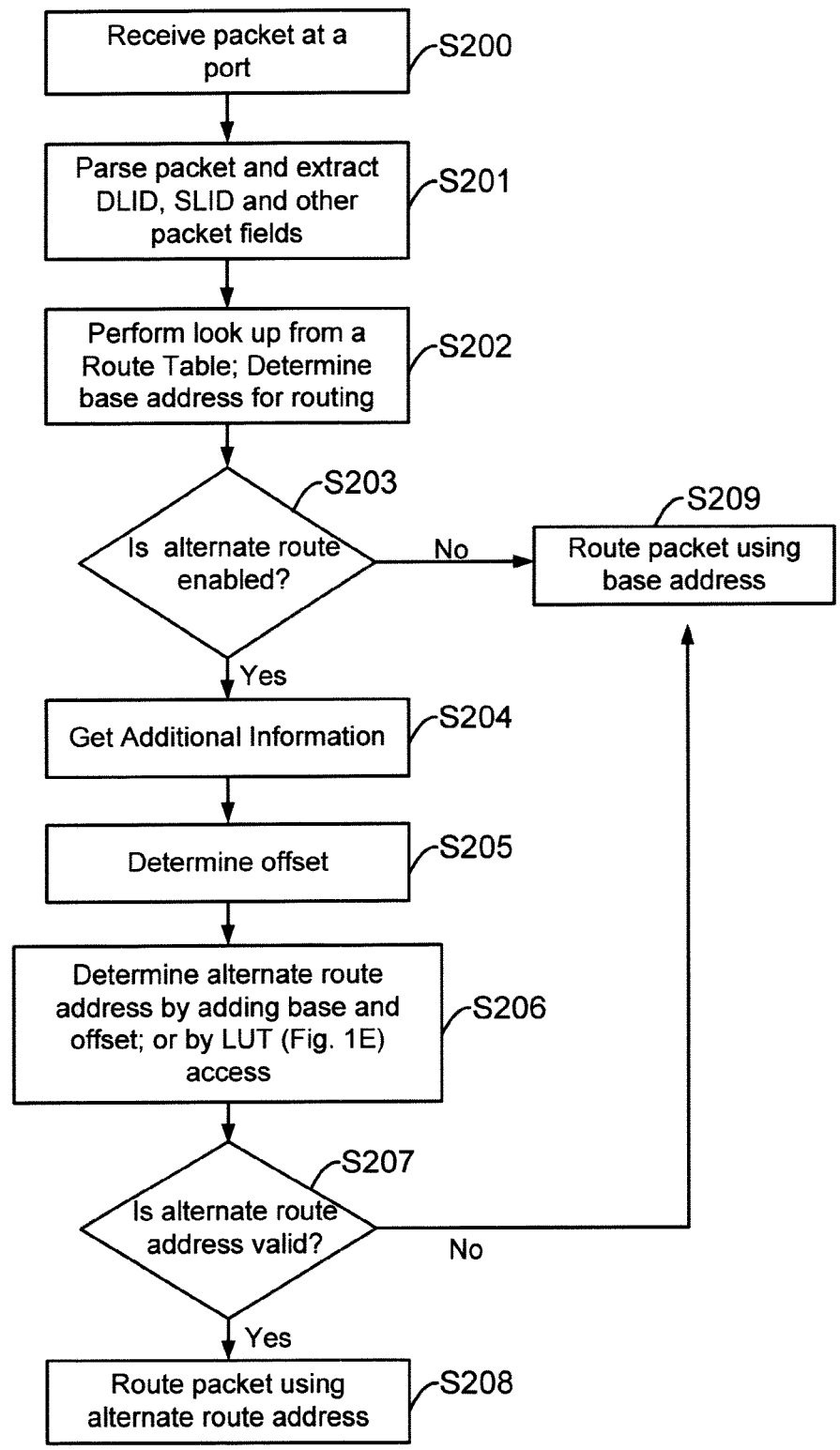
FIG. 2A shows a process flow for load-balancing in a multi-tier IB network, according to one embodiment.

FIG. 2A shows a process flow for load balancing in a Multi Level switch or a multi-tier IB network, according to one embodiment.

The process starts in step S200, when a packet arrives at a port (for example Port1 105, FIG. 1B).

In step S201, the receive segment (or receive port) (not shown) of Port1 105 parses the packet and extracts information, for example, DLID 122, SLID 121, Opcode 122A, QP 122B and other packet fields (FIG. 1D).

In step S202, the receive port performs a look up in routing table 102 using DLID 122. The output of the routing table is base route address 113 (FIG. 1E) that is used to route the packet if load balancing is not implemented, active or allowed for a current packet that is being processed (step S200).

In step S203, receive port determines if an alternate route 120 is allowed for the current packet. Processor 103 may set a control bit to allow alternate routes. Each DLID may also be programmed to enable or disable alternate routes. The QP value may also be programmed to determine if alternate routes are enabled (or allowed). The programming of allowed DLIDs and QPs may be unique for each possible DLID or QP value or may be configured as range of values.

In step S209, the port routes the packet using base route address 113, if an alternate route is not allowed in step S203. Step S209 is also described below in detail with respect to FIG. 2B.

If alternate route is allowed in step S203, then in step S204, additional information including DLID 122, SLID 121, Opcode 122A and QP 122B or other packet fields are obtained to determine alternate route address 120.

In step S205, an offset 112 is determined using the circuit described above with respect to FIG. 1D. It is noteworthy that the offset may be calculated using other algorithms.

In step S206, an alternate route is calculated. FIGS. 1C and 1E show examples for determining alternate route 120. There are advantages and disadvantages to each approach. For example, if circuit area is a consideration for the ASIC, then the circuit method of FIG. 1C may be preferred over the look up table approach of FIG. 1E, as it takes a fewer number of logic gates or area on the ASIC. Similarly, if alternate routes that are not a power of 2 i.e., 4,8,16, then the look up method of FIG. 1E may be preferred over the circuit of FIG. 1C.

In step S207, the port determines if the alternate route determined in step S206 is valid.

If the alternate route is valid in Step S207, then in step S208, the packet is routed using the alternate route address 120.

If the alternate route is invalid in Step S207, then in step S209, the packet is routed using the base route address 113.

Figure 2B:
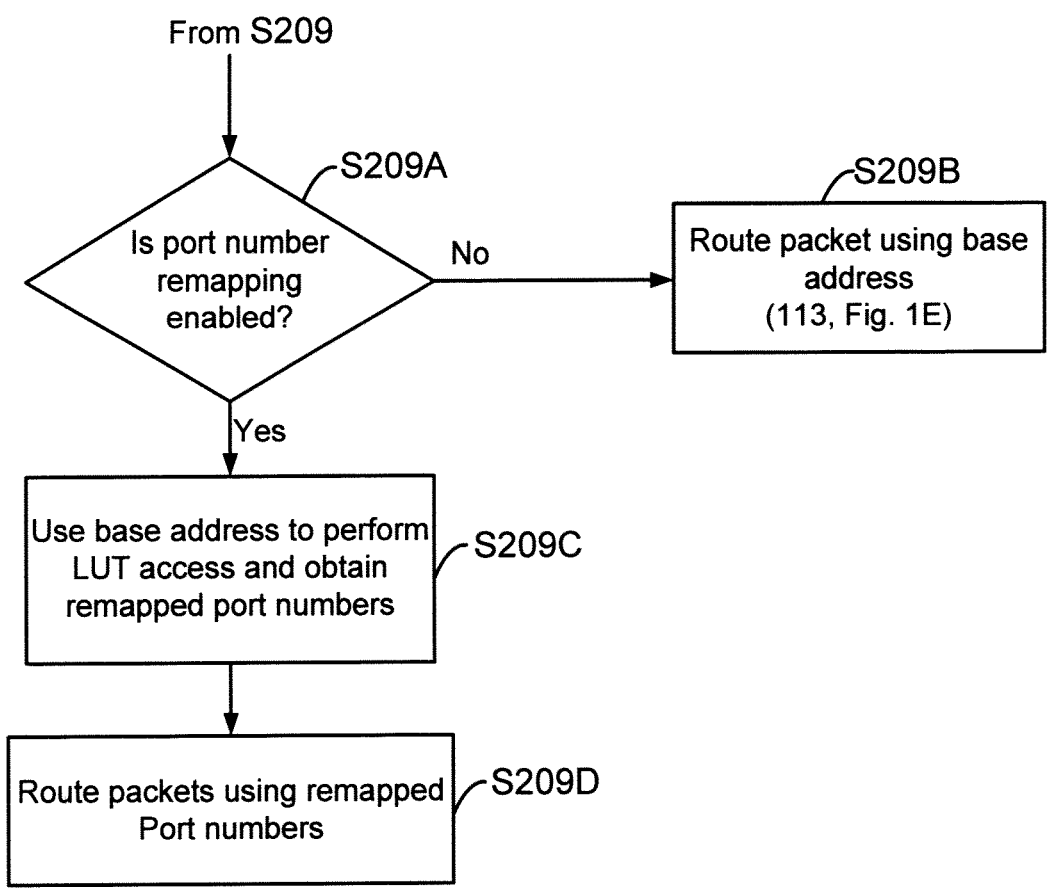
FIG. 2B shows a process flow diagram for routing packets using remapped port numbers, according to one embodiment

FIG. 2B shows a process flow diagram for performing step S209 (FIG. 2A). In step S209A, the process determines if port number remapping is enabled. As discussed above, a control bit may be set to enable or disable this feature. If remapping is not enabled, then in step S209B, the packet is routed using physical port numbers from the base address (route 113, FIG. 1E).

If port number remapping is enabled, then in step S209C, the base address is used to perform LUT 130 access and remapped port numbers are obtained. Thereafter, in step S209D; the packet is routed using remapped port number, instead of the physical port numbers based on route 113.

Although the present invention has been described with reference to specific embodiments, these embodiments are illustrative only and not limiting. Many other applications and embodiments of the present invention will be apparent in light of this disclosure and the following claims.

What is claimed is:

1. A method for routing packets in an Infiniband (IB) multi level switch and network, comprising:
    determining if the switch has been programmed to enable alternate routing for a packet by examining a control value based on a destination field for identifying a destination for the packet, wherein the alternate routing is selectably enabled and disabled by a switch processor by setting the control value, and a queue pair value;
    determining an alternate route address for the packet, if alternate routing is enabled; and
    routing the packet using the alternate route address, if the alternate route address is valid.

2. The method of claim 1, wherein the step of determining the alternate route address further comprises:
    adding a base route address to an offset address;
    determining if a wrap-around condition exists; and
    recalculating the alternate route address, if the wrap-around condition exists.

3. The method of claim 2, wherein the offset addresses is calculated using a programmable hamming code algorithm.

4. The method of claim 3, wherein the hamming code algorithm uses a programmable register accessible to a micro processor.

5. The method of claim 2, wherein the offset address is determined using a packet's destination local identifier ("DLID"), source local identifier ("SLID"), Opcode and destination queue pair ("QP") fields.

6. The method of claim 1, wherein the alternate route address is determined using a look up table.

7. The method of claim 6, wherein the look up table provides remapped port numbers.

8. The method of claim 1, wherein the step of determining if alternate routing is enabled for a packet is based on examining a packet's destination local identifier ("DLID").

9. The method of claim 1, wherein the step of determining if alternate routing is enabled for a packet is based on examining a packet's destination queue pair ("QP").

10. The method of claim 1, wherein alternate route selection is used for load balancing.

11. An IB switch element for routing packets, comprising:
    a processor that sets a control value for enabling and disabling routing of a packet by an alternate route, wherein the control value is based on a destination field for identifying a destination for the packet, and a queue pair value;
    a routing table in a port that determines if the switch has been programmed to enable alternate routing for a packet by examining the control value; determines a base route address, and if programmed to enable alternate routing for a packet, the port determines an alternate route address for a packet; and routes the packet using the alternate route address if the alternate route address is valid.

12. The IB switch of claim 11, wherein the port determines the alternate route address by adding the base route address to an offset address; determines if a wrap-around condition exists; and recalculates the alternate route address, if the wrap-around condition exists.

13. The IB switch of claim 12, wherein the port calculates the offset address using a hamming code algorithm.

14. The IB switch of claim 13, wherein the hamming code algorithm uses a programmable register accessible to a microprocessor.

15. The method of claim 12, wherein the port determines the offset address using at least a packet's destination local identifier ("DLID"), source local identifier ("SLID"), Opcode and destination queue pair ("QP") fields.

16. The IB switch of claim 12, wherein the port determines the alternate route address using a look up table.

17. The IB switch of claim 16, wherein the look up table provides remapped port numbers.

18. The IB switch of claim 12, wherein a packet's destination local identifier ("DLID") is examined to determine if alternate routing is enabled.

19. The IB switch of claim 12, wherein a packet's destination queue pair ("QP") is examined to determine if alternate routing is enabled.

20. The IB switch of claim 12, wherein alternate route selection is used for load balancing.

* * * * *